United States Patent
Kapoor et al.

(10) Patent No.: US 7,940,649 B2
(45) Date of Patent: May 10, 2011

(54) TECHNIQUES FOR GRACEFUL RESTART IN A MULTI-PROCESS OPERATING SYSTEM

(75) Inventors: Ruchi Kapoor, San Jose, CA (US); Chandrashekhar Appanna, Cupertino, CA (US); Siva Yaragalla, San Ramon, CA (US); Lester Bird, Tracy, CA (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 11/497,866

(22) Filed: Aug. 1, 2006

(65) Prior Publication Data

US 2008/0031239 A1    Feb. 7, 2008

(51) Int. Cl.
G01R 31/08    (2006.01)
H04J 1/16    (2006.01)
H04L 1/00    (2006.01)
H04L 12/28    (2006.01)

(52) U.S. Cl. .................. 370/218; 370/244; 370/401

(58) Field of Classification Search .................. 370/242, 370/389, 401, 218, 216, 244; 709/223, 230; 714/4
See application file for complete search history.

(56) References Cited

U.S. PATENT DOCUMENTS

| | | | |
|---|---|---|---|
| 6,704,795 B1 * | 3/2004 | Fernando et al. | 709/237 |
| 6,999,454 B1 * | 2/2006 | Crump | 370/389 |
| 7,023,808 B2 * | 4/2006 | Ball et al. | 370/238 |
| 7,359,377 B1 * | 4/2008 | Kompella et al. | 370/389 |
| 2003/0140167 A1 * | 7/2003 | Harvey et al. | 709/238 |
| 2005/0089015 A1 * | 4/2005 | Tsuge et al. | 370/351 |
| 2005/0135256 A1 * | 6/2005 | Ball et al. | 370/238 |
| 2005/0177634 A1 * | 8/2005 | Scudder et al. | 709/225 |
| 2006/0153086 A1 * | 7/2006 | Levy et al. | 370/242 |
| 2007/0014231 A1 * | 1/2007 | Sivakumar et al. | 370/216 |

OTHER PUBLICATIONS

Ramachandra et al., "Graceful Restart Mechanism for BGP", Network Working Group, Internet Draft—Aug. 2000, Expiration Date: Feb. 2001.*
S. Sangli, "Graceful Restart Mechanism for BGP draft-ietf-idr-restart-10.txt", Memo, Network Working Group, Internet Draft, dated Jun. 2004, 11 pgs.
T. Bates, "Multiprotocol Extensions for BGP-4", Memo, Network Working Group Request for Comments: 2858, dated Jun. 2000, 11 pgs.
Y. Rekhter, "A Border Gateway Protocol 4 (BGP-4)", Memo, Network Working Group Request for Comments: 1771, Memo, dated Mar. 1995, 57 pgs.
S. Bradner, "Key words for use in RFCs to Indicate Requirment Levels", Network Working Group, Request for Comments 2119, dated Mar. 1997, 3 pgs.

* cited by examiner

*Primary Examiner* — Ayaz R Sheikh
*Assistant Examiner* — Hoang-Chuong Q Vu
(74) *Attorney, Agent, or Firm* — Hickman Palermo Truong & Becker LLP (57) ABSTRACT

A method and apparatus is disclosed for graceful restart in a multi-process operating system. A transport protocol process, which is capable of restarting independently from the operating system, is executed in a network element. The network element executes a Border Gateway Protocol (BGP) process, which installs one or more routes in a global Routing Information Base (RIB). When the BGP process detects that the transport protocol process has become unavailable, the BGP process keeps the one or more routes in the global RIB even though the transport protocol process is not available.

22 Claims, 4 Drawing Sheets

TECHNIQUES FOR GRACEFUL RESTART IN A MULTI-PROCESS OPERATING SYSTEM

FIELD OF THE INVENTION

The present invention generally relates to network routing. The invention relates more specifically to techniques for graceful restart in a multi-process operating system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is an exterior gateway protocol (EGP) that is used to exchange routing information among network elements in the same or different networks. A network element is a device that is configured for managing, processing, and/or forwarding network traffic. (Examples of network elements include, but are not limited to, repeaters, bridges, switches, and routers.) In order to exchange BGP routing information, two network elements first establish a transport protocol session such as, for example, a Transmission Control Protocol (TCP) session or a Stream Control Transmission Protocol (SCTP) association. The BGP processes executing on the network elements then establish a BGP peering session by exchanging, over the transport protocol session, a series of BGP OPEN messages that define the parameters of the BGP session. After the BGP session is open, the BGP processes (referred to as BGP peers) exchange all of their routing information. Thereafter, only updates or changes to the routing information are exchanged, or advertised, between the BGP peers. The BGP peers maintain the exchanged routing information during the existence of the BGP session.

The routing information exchanged during a BGP session includes routes to address destinations in one or more networks. A route comprises an address prefix of the destination and attributes that describe the path to the destination. A BGP process stores the routes it receives from its BGP peers in a local Routing Information Bases (RIB). If a network element were configured to execute multiple BGP processes, typically each BGP process executing on the network element would manage its own local RIB. In a typical BGP process implementation, a local BGP RIB may include three distinct portions: (a) Adj-RIBs-In, which stores routes received from BGP peers or learned from other protocols, (b) Loc-RIB, which stores routes that the BGP process has selected by applying one or more route selection algorithms to the routes stored in Adj-RIBs-In, and (c) Adj-RIBs-Out, which stores routes that the BGP process has selected for advertisement to its BGP peers.

The routes that a BGP process stores in Adj-RIBs-In are typically received over a BGP session established with a BGP peer. The routes stored in Loc-RIB are selected from the routes in Adj-RIBs-In by applying one or more route selection algorithms. The routes selected by the BGP process and stored in the Loc-RIB usually represent the best paths to the routes' respective address destinations. Once the best route to a certain address destination is selected and stored in the Loc-RIB, the BGP process may advertise the route to its BGP peers by placing (or storing) the route in Adj-RIBs-Out.

In some network element architectures, some or all of the best routes stored in a BGP Loc-RIB are installed in a global RIB maintained at the network element. The global RIB includes routes that the network element receives over all of its route management protocols including, but not limited to, EGP protocols such as BGP, and Internal Gateway Protocols (IGP) such as Open Shortest Path First (OSPF) protocol, Interior Gateway Routing Protocol (IGRP), and Routing Information Protocol (RIP). Some or all of the routes in the global RIB are installed in one or more Forwarding Information Bases (FIBs) that are hosted at the network element. A FIB is a physical or logical table that stores routes used to forward network packets to the address destinations of the stored routes. A typical FIB stores only one route (the best route) for each address destination that is reachable through the network element that hosts the FIB. In a typical network element, a FIB is associated with a forwarding engine that is configured to receive network packets from other network elements and to forward these packets based on the routes installed in the FIB. A forwarding engine may comprise a set of hardware and/or software components capable of receiving and forwarding network traffic, and in different network element architectures the forwarding engine may be executing on a route processor or on a line card of the network element.

In a standard BGP implementation (such as, for example, a BGP implementation conforming to the BGP-4 standard defined in RFC1771 or to the MP-BGP standard defined in RCF2858), when the BGP session between two BGP peers is closed or lost for whatever reason, each BGP peer discards any routing information received from the other peer and removes any routes received from the other peer from its global RIB and its FIBs. Thus, when afterwards the two BGP peers re-establish a new BGP session, in order to provide forwarding capabilities on each other's routes, the two BGP peers need to go through the same time and resource consuming process of exchanging anew all of their routing information, running route selection algorithms, and installing the selected routes in their respective global RIBs and FIBs.

In order to reduce the negative effects of a BGP session loss, a Graceful Restart mechanism for BGP has been proposed, the latest version of which was published by the IETF in December 2004 as draft-ietf-idr-restart-10.txt. The BGP Graceful Restart mechanism provides a new BGP capability, termed "Graceful Restart Capability", which is advertised by a BGP process during the set up of a BGP session with a BGP peer. A BGP process that advertises a Graceful Restart capability to its BGP peer guarantees that, in the event the BGP peer restarts, the network element executing the BGP process is capable of preserving the routes in its FIB received from the BGP peer and is capable of forwarding packets on these routes. The BGP process that restarts is commonly referred to as the restarting BGP peer; the BGP process that has established a BGP session to a restarting BGP peer is commonly referred to as the receiving BGP peer. According to the BGP Graceful Restart mechanism, when the receiving BGP peer detects that the restarting BGP peer has restarted, the receiving BGP peer marks as "stale" the routes in its Loc-RIB that are received from the restarting BGP peer. However, no routes are removed from the global RIB or from the FIBs that are hosted by the network element executing the receiving BGP peer, and forwarding of network packets on any "stale" routes is not affected. (As referred to herein, a "stale" route is a route that has been received over a BGP session that has since become unavailable.) In this way, the network element executing the receiving BGP peer preserves its forwarding state and guarantees non-interrupted forwarding service on routes received from the restarting BGP peer.

The BGP Graceful Restart mechanism has several disadvantages. One disadvantage is that the BGP Graceful Restart mechanism only guarantees forwarding of network packets for a network element executing the receiving BGP peer. The BGP Graceful Restart mechanism does not provide, or require, that a network element executing a restarting BGP peer preserve its forwarding state and guarantee the forwarding of network packets on routes received from a receiving BGP peer. In some network element architectures, this problem is addressed by providing the network element with one or more standby forwarding engines. When a BGP process executing at such network element restarts for whatever reason, the network element switches the forwarding state of its active forwarding engine to a standby forwarding engine (by, for example, installing all routes from the active FIB into the standby FIB). However, network elements supporting one or more standby forwarding engines are generally more expensive and more costly to maintain.

Another disadvantage of the BGP Graceful Restart mechanism is that it presumes the restarting BGP peer would always restart as a result of the loss of the transport protocol session over which a BGP session to the receiving BGP peer is established. For example, the BGP Graceful Restart mechanism is only applicable to a receiving BGP peer that has established a BGP session to a restarting BGP peer that is executing in a monolithic Operating System (OS). In a monolithic OS, a BGP process cannot continue executing when the transport protocol process, over which a BGP session is established, becomes unavailable since the transport protocol process is built into the kernel of the OS. When the transport protocol process crashes (which is one of the common causes of BGP process restarts), the entire OS restarts which in turn causes the BGP process to restart. Thus, the BGP process cannot continue executing when the transport protocol process crashes or becomes otherwise unavailable.

In a multi-process OS, however, the different OS processes execute over a microkernel, and each process is capable of restarting individually and separately from the microkernel and the other processes in the OS. (An example of a multi-process OS is the modular IOS provided by Cisco Systems, Inc.) In a multi-process OS, a transport protocol process, such as a TCP process, is capable of restarting without causing a BGP process executing in the OS to restart. However, when the BGP process detects that the BGP sessions it has established to its BGP peers have been lost (because of the transport protocol process restart), the BGP process must remove from the global RIB and from the FIB the routes it has received over these BGP sessions, even though the BGP process has not restarted and regardless of whether the BGP process has been configured to implement the BGP Graceful Restart mechanism. Removal of the routes from the global RIB and the FIB, however, causes an interruption in the forwarding service provided by the network element running the multi-process OS because network packets cannot be forwarded over the routes that are removed from the FIB.

Based on the foregoing, there is a clear need for graceful restart techniques in multi-process operating systems that overcome the disadvantages described above and that facilitate non-interrupted forwarding service across transport protocol process restarts.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for graceful restart in a multi-process operating system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method for Graceful Restart in a Multi-Process Operating System According to One Embodiment
4.0 Implementation Mechanisms—Hardware Overview
5.0 Extensions and Alternatives 1.0 GENERAL OVERVIEW The needs identified in the foregoing Background, and other needs and objects that will become apparent for the following description, are achieved in the present invention, which comprises, in one aspect, a method for graceful restart in a multi-process operating system. A transport protocol process, which is capable of restarting independently from the operating system, is executed in a network element. A BGP process executing on the network element installs one or more routes in a global Routing Information Base (RIB). The BGP process detects that the transport protocol has become unavailable. The one or more routes are kept in the global RIB even though the transport protocol process has become unavailable.

In a feature of this aspect, the one or more routes are also installed in a Forwarding Information Base (FIB). In this feature, the one or more routes are kept in the FIB even though the transport protocol process has become unavailable, and network packets are forwarded over at least one route of the one or more routes that are installed in the FIB.

In one feature of this aspect, the BGP process detects that the transport protocol process has become unavailable by receiving a notification that indicates that the transport protocol process has restarted. In this feature, a system manager that is executed at the network element and that is capable of detecting transport protocol restarts may send the notification to the BGP process.

In a feature of this aspect, the BGP process establishes a BGP session with a BGP peer process over a transport protocol session managed by the transport protocol process. The BGP peer process executes on a different network element. A BGP Graceful Restart capability is negotiated for the BGP session, where the negotiated BGP Graceful Restart capability indicates that the different network element is capable of forwarding network packets on routes received from the BGP process for a period of time during which the BGP session is not available. After establishing the BGP session, the BGP process receives the one or more routes from the BGP peer process over the session. In this feature, after the transport protocol process becomes unavailable, the BGP process marks as stale the one or more routes in a local RIB that is managed by the BGP process.

In this feature, after the transport protocol process has restarted, the BGP process establishes a new BGP session with the BGP peer process and notifies the BGP peer process that the transport protocol has restarted. The BGP process then receives a first set of routes from the BGP peer process over the new BGP session. The BGP process unmarks as stale each route of the one or more routes in the local RIB that is included in the received first set. After unmarking the routes, the BGP process removes from the global RIB any routes that are still marked as stale in the local RIB. In this feature, the BGP process may start removing stale routes from the global RIB in response to receiving an End-Of-RIB marker from the BGP peer process, or in response to the expiration of a timer that is set when it is detected that the transport protocol process has become unavailable. Further, in this feature detecting that the transport protocol has become unavailable may include detecting that the established BGP session has become unavailable as a result of a failure of the underlying transport protocol session.

In a feature of this aspect, the network element is any one of a router and a switch. The transport protocol process may be a Transmission Control Protocol (TCP) process or a Stream Control Transmission Protocol (SCTP) process.

In another aspect, the present invention encompasses a data packet router. The router comprises one or more processors and a network interface that is coupled to a data network for receiving one or more packet flows therefrom. The one or more processors execute a multi-process Operating System (OS). The multi-process OS comprises a system manager, a TCP process, and a BGP process. In the multi-process OS, at least the TCP process is capable of being restarted separately from the OS. The BGP process is configured to install one or more routes in a global RIB and to receive a notification from the system manager when the TCP process becomes unavailable. The BGP process keeps the one or more routes in the global RIB even though the TCP process has become unavailable.

In a feature of this aspect, the BGP process establishes a BGP session with a BGP peer process over a TCP session managed by the TCP process. The BGP peer process executes on a network element that is different than the data packet router. A BGP Graceful Restart capability is negotiated for the BGP session, where the negotiated BGP Graceful Restart capability indicates that the network element is capable of forwarding network packets on routes received from the BGP process for a period of time during which the BGP session is not available. The BGP process receives the one or more routes from the BGP peer process over the BGP session, and stores the one or more routes in a local RIB. In response to detecting that the TCP process has become unavailable, the BGP process marks as stale each of the one or more routes in the local RIB.

In this feature, after the TCP process has restarted, the BGP process establishes a new BGP session with the BGP peer process and notifies the BGP peer process that that the old BGP session was lost because of a TCP process restart. The BGP process then receives a first set of routes from the BGP peer process over the new BGP session. Each route of the one or more routes in the local RIB that is included in the first set is then unmarked as stale. Any routes in the local RIB that still remain marked as stale are then removed from the global RIB.

In a feature of this aspect, the data packet router further comprises a forwarding engine that includes a FIB. The one or more routes received from the BGP peer process are installed in the FIB. The forwarding engine forwards network packets over at least one route of the one or more routes installed in the FIB for a period of time during which the TCP process is unavailable.

In other aspects, the invention encompasses a computer apparatus and a computer-readable medium configured to carry out the foregoing steps.

2.0 STRUCTURAL AND FUNCTIONAL OVERVIEW

Figure 1:
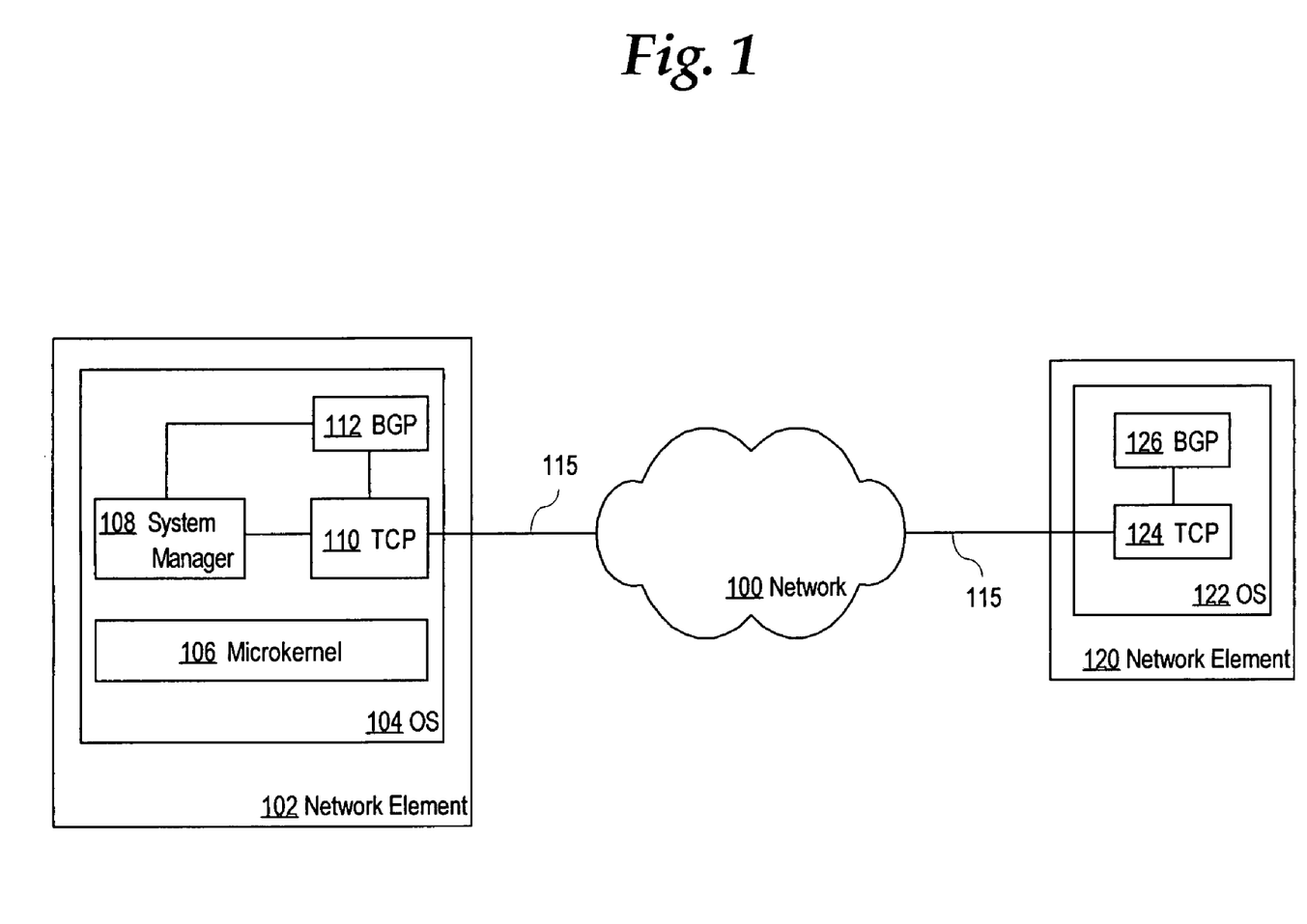
FIG. 1 is a block diagram that illustrates an overview of an operational context in which one embodiment may be implemented.

FIG. 1 is a block diagram that illustrates an overview of an operational context in which one embodiment may be implemented. Network element 102 is communicatively connected to network element 120 over network 100. In different embodiments implemented in this operational context, the network elements may be any devices that are configured for managing, processing, and/or forwarding of network traffic, such as, for example, switches and routers.

In the embodiment depicted in FIG. 1, each of network elements 102 and 120 comprise a forwarding plane and a control plane. (A control plane is generally a set of protocols and components executing in a network element that facilitate the receiving and managing of routing information. A forwarding plane is generally a set of protocols and components executing in a network element that facilitate the forwarding of network traffic based on the routing information provided by the control plane.) For example, network element 120 maintains one or more FIBs and is capable of forwarding network packets to network element 102 based on routes received from network element 102; similarly, network element 102 maintains one or more FIBs and is capable of forwarding network packets to network element 120 based on routes received from network element 120. While some processes and components of the control planes in network elements 102 and 120 are depicted in FIG. 1, in order to avoid unnecessarily obscuring the present invention, the processes and other components of the forwarding planes in network elements 102 and 120 are not depicted in FIG. 1.

Network element 120 comprises operating system (OS) 122. OS 122 executes TCP process 124 and BGP process 126. In some embodiments, OS 122 may be a monolithic operating system. In other embodiments, OS 122 may be a multi-process operating system in which the techniques described herein may be implemented.

Network element 102 comprises multi-process OS 104 in which the techniques for graceful restart described herein are implemented. Multi-process OS 104 is executing in its address space one or more processes that are capable of restarting separately and independently of each other and of OS 104. OS 104 comprises microkernel 106, system manager 108, TCP process 110, and BGP process 112.

Microkernel 106 is the kernel of OS 104, and provides operating system services to processes executing in the operating system address space as well as to user processes executing in the user, or non-operating system, address space. Examples of such operating system services include, but are not limited to, memory allocation, CPU scheduling, disk access support, and thread execution support.

System manager 108 is a software component that monitors and/or manages processes that are executing in OS 104. In different embodiments, system manager 108 may be implemented in a variety of ways including, but not limited to, as a separate process, as a thread within a process, and as an operating system service. In addition, in different embodiments system manager 108 may be monitoring and managing only processes executing within the operating system address space, or in addition may also be managing user processes executing in the user address space. In the embodiment depicted in FIG. 1, system manager 108 is capable of determining when another operating system process, such as for example, TCP process 110 restarts or otherwise becomes unavailable. When system manager 108 detects that a process such as TCP process 110 has restarted, system manager 108 may be configured to send an appropriate notification to OS 104 and/or to other user or operating system processes and applications, such as, for example, BGP process 112. In different embodiments, system manager 108 may determine that another process has become unavailable through a variety of means including, but not limited to, receiving a notification from the restarting process, polling the process periodically, and receiving a call from a call-back function that is registered with the restarting process.

TCP process 110 is a transport protocol process that provides session-oriented transport protocol connectivity for processes and applications executing on network element 102. TCP process 110 maintains one or more transport protocol sessions to TCP processes executing on other network entities, and is configured for receiving and sending data packets over these sessions. For example, TCP process 110 is configured to receive messages from a process or an application executing on network element 102, store the message data in one or more packets, and transmit the packets over a TCP session to a destination network entity. TCP process 110 is also configured to receive one or more packets over a TCP session from a network entity, assemble the data from the one or more packets into a message, and send the message to a process or an application executing on network element 102. In the embodiment depicted in FIG. 1, TCP process 110 has established TCP session 115 with TCP process 124 that executes on network element 120. TCP process 110 has established TCP session 115 on behalf of BGP process 112 in order to provide the BGP process with transport protocol connectivity to BGP process 126 that is executing in network element 120.

TCP process 110 is capable of restarting separately from OS 104 and from the other processes in multi-process OS 104. In the embodiment depicted in FIG. 1, TCP process 110 is communicatively and/or operatively connected to system manager 108. In this embodiment, TCP process 110 is configured to notify system manager 108 when it restarts or when it is about to become unavailable for whatever reason. In different embodiments, TCP process 110 may use a variety of mechanisms to notify system manager 108 including, but not limited to, callback functions, triggers, and Application Programming Interface (API) calls.

BGP process 112 is configured for implementing the graceful restart techniques described herein. In the embodiment depicted in FIG. 1, BGP process 112 executes as a process within OS 104. In other embodiments, however, a BGP process implementing the techniques described herein may be executing as a user process in the user address space of a network element that is executing a multi-process operating system. In addition, in some embodiments a BGP process may be configured to implement the graceful restart techniques described herein over a transport protocol other than TCP, such as for example, over SCTP. Thus, the embodiment of the techniques for graceful restart depicted in FIG. 1 is to be regarded in an illustrative rather than a restrictive sense.

Figure 2A:
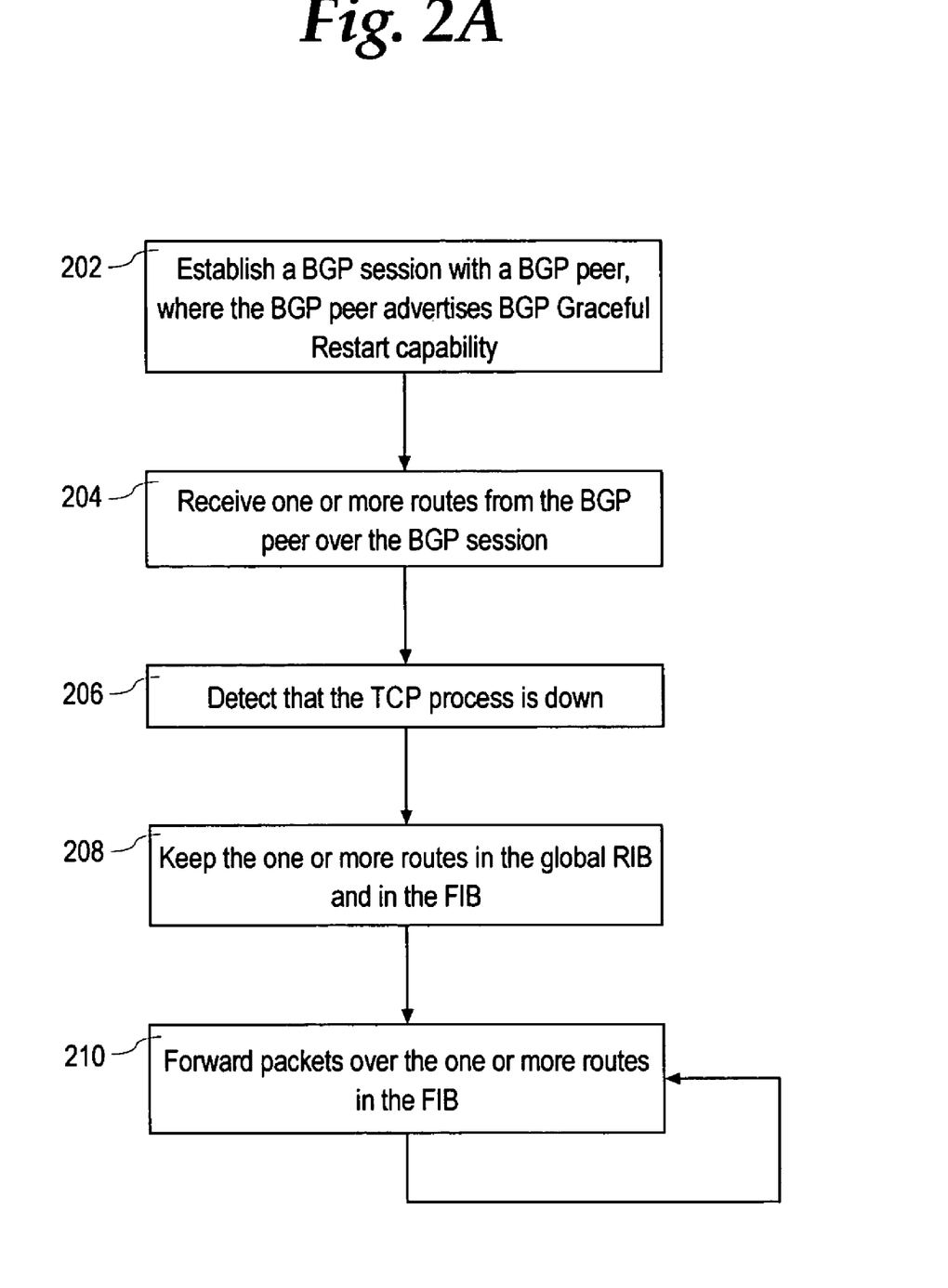
FIG. 2A is a flow diagram that illustrates a high level overview of one embodiment of a method for graceful restart in a multi-process operating system.

FIG. 2A is a flow diagram that illustrates a high level functional overview of one embodiment of a method for graceful restart in a multi-process operating system.

In step 202, a BGP process (e.g. BGP process 112 in FIG. 1), establishes a BGP session with a BGP peer (e.g. BGP process 126 in FIG. 1). During the establishing of the BGP session, in some embodiments the BGP peer may advertise a Graceful Restart Capability as provided by the BGP Graceful Restart mechanism described in the draft-ietf-idr-restart-10.txt IETF draft. By advertising the Graceful Restart Capability, the BGP peer indicates that the network element on which it is executing (e.g. network element 120 in FIG. 1) is capable of forwarding packets on routes received from the BGP process for a period of time during which the BGP session is not available.

After the BGP session between the BGP process and the BGP peer is established, in step 204 the BGP process receives a set of routes from the BGP peer. The BGP process selects one or more routes from the set of routes as best routes, stores the one or more routes in its local RIB, and installs these one or more routes in the global RIB and in its one or more FIBs. Thereafter, the network element on which the BGP process is executing (e.g. network element 102 in FIG. 1) starts forwarding packets on these one or more routes.

In step 206, the BGP process detects that the TCP process (e.g. TCP process 110 in FIG. 1) over which the BGP session to the BGP peer is established has become unavailable. In some embodiments, the BGP process may detect that the TCP process is down by receiving a notification from a system manager, such as system manager 108 in FIG. 1. In other embodiments, the BGP process may detect that the TCP process is down by other means, such as for example, callback functions, triggers, API calls, or a direct notification from the TCP process.

In step 208, the BGP process keeps the one or more routes in the global RIB and in the FIB even though the TCP process has become unavailable and the BGP session over which the routes were received has been lost. Thus, in step 210 the network element on which the BGP process is executing (e.g. network element 102 in FIG. 1) may continue forwarding packets on the one or more routes. In this way, since the one or more routes are kept in the global RIB and in the FIB, the techniques described herein provide for non-stop forwarding service from the network element as well as high route-availability functionality for clients and other processes executing in the network element that rely on BGP routes that are installed in the global RIB.

The operational context depicted in FIG. 1, and the embodiment of the method for graceful restart in a multi-process OS depicted in FIG. 2A, illustrate a BGP process implementing the techniques described herein relative to a single BGP session established with a single BGP peer. However, in practice a BGP process in a network element (such network element 102 in FIG. 1) typically establishes BGP sessions with a plurality of BGP peers that execute on a plurality of network elements (such as network element 120 in FIG. 1). In such cases, according to the techniques described herein, a BGP process implements the method illustrated in FIG. 2A for each BGP session it has established with any BGP peer. Thus, a BGP process may implement the techniques described herein relative any number of BGP sessions that it may have established to numerous BGP peers, and for this reason the operational context depicted in FIG. 1 and the embodiment of the method depicted in FIG. 2A are to be regarded in an illustrative rather than a restrictive sense with respect to the number of BGP sessions and BGP peer to which they may be applicable.

3.0 METHOD FOR GRACEFUL RESTART IN A MULTI-PROCESS OPERATING SYSTEM ACCORDING TO ONE EMBODIMENT

Figure 2B:
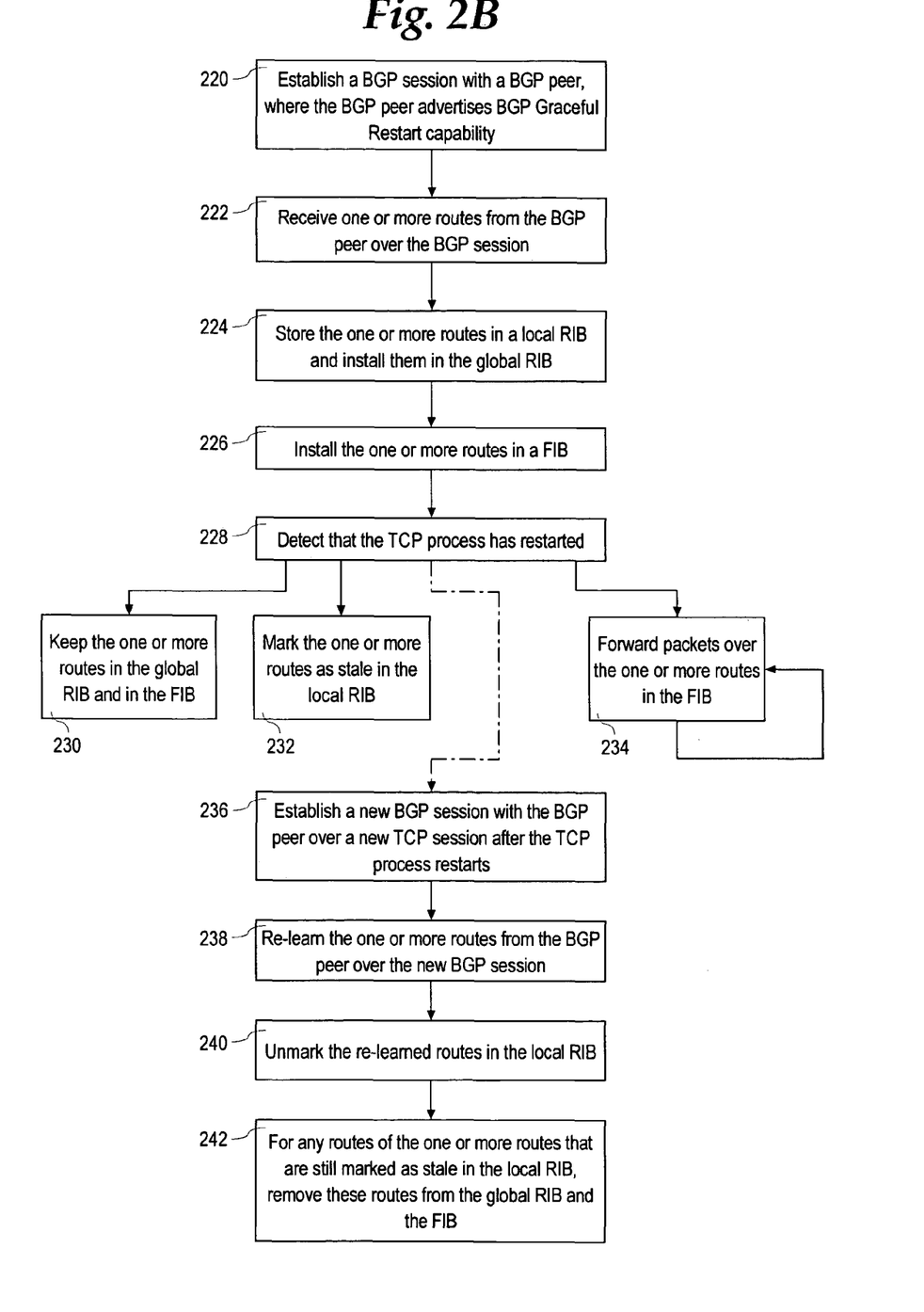
FIG. 2B is a flow diagram that illustrates one embodiment of a method for graceful restart in multi-process operating system.

FIG. 2B is a flow diagram that illustrates one embodiment of a method for graceful restart in a multi-process operating system. For illustration purposes only, in this embodiment a BGP process establishes a BGP session with a BGP peer over a TCP session, which is managed by a TCP process executing in the multi-process operating system. In other embodiments, a BGP process implementing the techniques described herein may establish BGP sessions to its BGP peers over any session-oriented transport protocol, such as, for example, SCTP.

Establishing a BGP Session and Receiving Routes from a BGP Peer

In step 220, a BGP process that implements the techniques described herein establishes a BGP session with a BGP peer over a TCP session that is managed by a TCP process. During the establishing of the BGP session, the BGP peer advertises a Graceful Restart Capability as provided by the BGP Graceful Restart mechanism described in the draft-ietf-idr-restart-10.txt IETF draft. Specifically, the BGP peer includes a Graceful Restart Capability attribute in a BGP OPEN message, which is sent to the BGP process. The Graceful Restart Capability attribute includes one or more combinations of Address Family Identifier (AFI)/Subsequent Address Family Identifier (SAFI), where each AFI/SAFI combination identifies an address family of routes for which the network element executing the BGP peer is capable of preserving forwarding during a period of time in which the BGP process may be restarting.

After the BGP session is established, in step 222 the BGP process receives a set of routes from the BGP peer. In BGP implementations that make use of Adj-RIBs-In table to store routes received from peers, the BGP process may store the set of routes in its Adj-RIBs-In and may run one or more route selection algorithms to select the one or more routes from the set.

After the one or more routes are selected, in step 224 the BGP process first stores the one or more routes in its local RIB, and then installs these routes in the global RIB maintained at the network element that executes the BGP process. For example, in BGP implementations that make use of a Loc-RIB, the BGP process may first store the one or more selected routes in its Loc-RIB before installing the one or more routes in the global RIB.

In step 226, the BGP process installs the one or more routes in the FIB maintained at the network element. At this point, the network element is capable of providing forwarding services on the one or more routes. For example, based on the one or more routes stored in the FIB, the network element is capable of forwarding network packets that it receives to the address destinations of the one or more routes. The network packets to the address destinations of any particular route of the one or more routes may be forwarded to the network element executing the BGP peer (if the BGP peer has indicated its network element as the next hop in a NEXT_HOP attribute of the particular route), or to any other network element.

Detecting that the TCP Process has Restarted

In step 228, the BGP process detects that the TCP process has become unavailable. For example, the BGP process may determine that the TCP process, and the TCP session over which the BGP session to the BGP peer was established, are down but will soon be available. Alternatively, the BGP process may determine that the TCP process has restarted.

In the embodiment depicted in FIG. 2B, a system manager detects that the TCP process has failed. For example, a component of the multi-process OS, which is responsible for restarting failed processes, may record with the system manager a notification which indicates that the TCP process is about to restart and the reason for the restart. The system manager may then notify the BGP process accordingly.

In other embodiments, the BGP process may use any now known or later-developed mechanisms to detect that the TCP process has failed, is about to restart, or has restarted. For example, the TCP process may notify the BGP process directly by using Inter-Process Communication (IPC) mechanisms, such as, for example, signals, semaphores, or shared memory. In another example, the BGP process may learn that the TCP process has become unavailable in a variety of ways, such as, for example, callback functions, triggers, or API calls, that the underlying multi-process OS provides. Further, in some embodiments the BGP process may use a polling mechanism to periodically check whether the TCP process has failed, while in other embodiments the BGP process may wait to be notified of a TCP process failure. In addition, depending on the particular requirements for providing non-stop forwarding service, some embodiments may implement the fastest available mechanism to detect that the TCP process has failed.

Keeping the Routes in the Global RIB and in the FIB, and Marking the Routes in the Local RIB as Stale Instead of immediately removing the one or more routes from the global RIB and the FIB, in step 230 the BGP process keeps the one or more routes in the global RIB and in the FIB even though the TCP process has become unavailable and the BGP session over which the routes were received has been lost. Since the BGP process has detected that the TCP process has failed but will soon be available again, the BGP process keeps the one or more routes intact in the global RIB and in the FIB. This allows the network element that executes the BGP process to continue forwarding packets on the one more routes, as illustrated in step 234. As long as the one or more routes are present in the FIB, the network element may repeat step 234 and the forwarding service on the one or more routes at the network element is not interrupted.

In this way, the techniques described herein account for the differences between communication loss at the network protocol layer (such as, for example, a communication link failure), and a transport protocol session loss. While a communication loss at the network protocol layer would cause a total loss of forwarding service (since typically forwarding is performed over a network protocol such as IP), the techniques described herein provide for non-stop forwarding services when only a transport protocol session loss occurs. In addition, the techniques described herein may be implemented to prevent forwarding service loss when a BGP session fails for any reason besides transport protocol session loss, such as, for example, the expiration of a BGP session timer and forced BGP session re-set.

Concurrently with performing steps 230 and 234, in step 232 the BGP process marks as stale in the local RIB any routes that it has received from its BGP peer over the BGP session. In BGP implementations that make use of Loc-RIB table, the BGP process may mark as stale the one or more routes that are stored in the Loc-RIB. In the embodiment depicted in FIG. 2A, in step 232 the BGP process may also start a local timer, which indicates the estimated number of seconds that it will take to re-establish a BGP session with the BGP peer and re-learn the routes from the BGP peer. The size of the timer may be based on a RESTART_TIME value that is included in the Graceful Restart Capability attribute in the BGP OPEN message received from the BGP peer.

In some embodiments, a user command may be provided for querying the local RIB for routes that are marked as stale. In other embodiments, any command that returns routes from the global RIB shows the stale routes. Providing user commands that show stale routes may allow network engineers to diagnose and troubleshoot BGP session flaps, and to manually correct routing problems that may result from such flaps.

Establishing a New BGP Session and Re-Learning the Routes from the BGP Peer

After the TCP process on the network element executing the BGP process restarts, in step 236 the BGP process establishes a new BGP session with the BGP peer over a new TCP session managed by the (now restarted) TCP process. During the establishing of the new BGP session, the BGP process notifies the BGP peer of the TCP restart by sending to the BGP peer a BGP OPEN message that includes a Graceful Restart Capability attribute, where the Graceful Restart Capability attribute includes a flag that has its RESTART_STATE bit set. In this way, the BGP process signals to the BGP peer that while a BGP session restart has occurred the forwarding service on routes received from the BGP peer has not been interrupted.

After the new BGP session is established, in step 238 the BGP process re-learns the one or more routes from the BGP peer. Specifically, the BGP process goes into a read-only mode in which the BGP process receives routes from the BGP peer but does not perform any route selection algorithms and does not insert any routes in its local RIB, the global RIB, and the FIB. In BGP implementations that make use of Adj-RIBs-In table, the BGP process may store the routes re-learned from the BGP peer in this table but does not store or otherwise propagate the re-learned routes to any other tables of the local RIB.

In the embodiment depicted in FIG. 2B, the BGP process may continue re-learning routes from its BGP peer until a certain condition is satisfied. For example, the BGP process may continue re-learning routes from the BGP peer over the new BGP session until a local timer expires, where the local timer was set when it was detected that the TCP process had become unavailable. In another example, the BGP process may continue re-learning routes from the BGP peer over the new BGP session until it receives an End-Of-RIB marker from the BGP peer. As described in the draft-ietf-idr-restart-10.txt IETF draft, an End-Of-RIB marker indicates to the BGP process that the BGP peer has completed the initial routing update that is performed right after the new BGP session is established. An End-Of-RIB marker is a BGP UPDATE message that includes no reachable NLRIs in its NLRI attribute and no withdrawn NLRIs in its withdrawn NLRI attribute. For example, under the BGP-4 standard that is applicable to the IPv4 address family of routes, an End-Of-RIB marker is a BGP UPDATE message with the minimum possible length. Under the MP-BGP standard that is applicable to address families other than IPv4, an End-Of-RIB marker is a BGP UPDATE message that includes only the MP_UNREACH_NLRI attribute with no withdrawn routes for the AFI/SAFI combination associated with the address family of routes specified in the attribute.

Concurrently with, or subsequently to, performing step 238, the BGP process performs step 240. In step 240, for each route re-learned from the BGP peer over the new BGP session, the BGP process determines whether the re-learned route is marked as stale in the local RIB. If the re-learned route is marked as stale, the BGP process unmarks this route in the local RIB. In BGP implementations that make use of Loc-RIB table, the BGP process may simply change or remove a status flag associated with the re-learned route in the Loc-RIB in order to indicate that this route is no longer stale. In some embodiments, the BGP process may perform step 240 during the process of receiving the re-learned routes; in other embodiments, the BGP process may perform step 240 after the initial routing update from the BGP peer is completed. By providing for marking and unmarking routes as stale, the techniques described herein provide for fast BGP route convergence and avoid expending processing resources to perform route selection algorithms on routes that are re-learned from the BGP peer over the new BGP session.

Removing Stale Routes from the Global RIB and the FIB

Step 242 is performed after the BGP process has determined that the BGP peer has completed the initial routing update for the new BGP session. The BGP process may make this determination based on the expiration of a local timer or in response to receiving an End-Of-RIB marker. In step 242, the BGP process removes from the global RIB and the FIB any routes that are still marked as stale in the local RIB.

In BGP implementations that make use of Adj-RIBs-In and Loc-RIB tables, once the initial routing update from the BGP peer is completed, the BGP process goes into normal mode, performs its route selection algorithms on the re-learned routes that are stored in the Adj-RIBs-In, and installs the best selected routes in the Loc-RIB. In these implementations, as part of operating in normal mode, the BGP process may remove from the Loc-RIB (and consequently from the global RIB and the FIB) any routes that are still marked as stale.

For example, during the initial routing update, the BGP process may re-learn from the BGP peer over the new BGP session all of the one or more routes that were previously marked as stale in the local RIB. In this case, the BGP process simply unmarks as stale all of the one or more routes in the local RIB and none of these routes are removed from the global RIB or the FIB. In another example, the BGP process may receive from the BGP peer over the new BGP session a set of routes that does not include all of the one or more routes that were previously marked as stale in the local RIB. In other words, the BGP process may not re-learn all of the previously received routes. In this case, the BGP process unmarks as stale all of the re-learned routes in the local RIB, and removes from the local RIB, the global RIB, and the FIB all stale routes that have not been re-learned over the new BGP session.

The embodiment of the method for graceful restart in a multi-process OS depicted in FIG. 2B illustrate a BGP process implementing the techniques described herein relative to a single BGP session established with a single BGP peer.

However, in practice a BGP process in a network element typically establishes BGP sessions with a plurality of BGP peers that execute on a plurality of network elements. In such cases, according to the techniques described herein, a BGP process implements the method illustrated in FIG. 2B for each BGP session it has established with any BGP peer. Thus, a BGP process may implement the techniques described herein relative any number of BGP sessions that it may have established to numerous BGP peers, and for this reason the embodiment of the method depicted in FIG. 2B is to be regarded in an illustrative rather than a restrictive sense.

4.0 IMPLEMENTATION MECHANISMS

Hardware Overview

Figure 3:
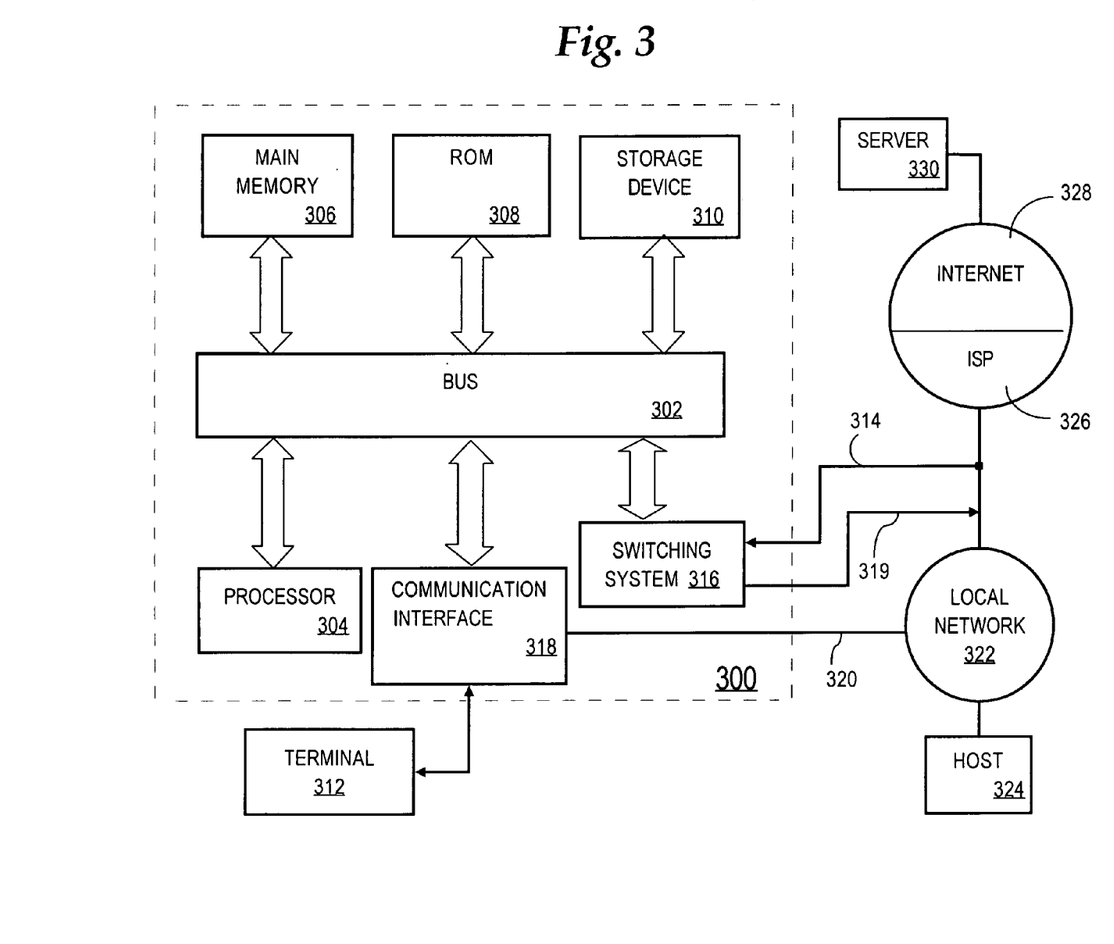
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for graceful restart in a multi-process operating system. According to one embodiment of the invention, the techniques for graceful restart are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for graceful restart in a multi-process operating system as described herein.

Processor 304 may execute the received code as it is received, and/or stored in storage device 310, or other non-volatile storage for later execution. In this manner, computer system 300 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
one or more processors;
first one or more stored sequences of instructions which, when executed by the one or more processors, cause the one or more processors to perform at least executing a transport protocol process;
and
second one or more stored sequences of instructions which, when executed by the one or more processors, cause the one or more processors to perform:
executing a Border Gateway Protocol (BGP) process that installs one or more routes in a global Routing Information Base (RIB);
wherein the global RIB stores routes that are received over a BGP protocol and over one or more route management protocols that are different than the BGP protocol;
wherein executing the BGP process comprises:
establishing, over a transport protocol session managed by the transport protocol process, a BGP session with a BGP peer process that executes on a network element that is different than the apparatus, wherein establishing the BGP session comprises negotiating a BGP Graceful Restart capability which indicates that the network element is configured to forward packets on routes received from the BGP process for a period of time during which the BGP session is not available; and
at the BGP process, receiving the one or more routes from the BGP peer process over the BGP session;

at the BGP process, detecting that the transport protocol process has become unavailable, wherein the BGP process has not restarted;
after the transport protocol process has become unavailable, marking as stale each of the one or more routes in a local RIB managed by the BGP process;
keeping, without changing, the one or more routes in the global RIB even though the transport protocol process has become unavailable;
after the transport protocol process has restarted, establishing a new BGP session to the BGP peer process over a new transport protocol session, wherein establishing the new BGP session comprises notifying the BGP peer process that the transport protocol process has restarted;
at the BGP process, receiving a first set of routes from the BGP peer process over the new BGP session; and
unmarking as stale each route of the one or more routes in the local RIB that is included in the received first set of routes.

2. The apparatus of claim 1, further comprising a Forwarding Information Base (FIB) in which the one or more routes are installed, wherein the sequences of instructions that cause the one or more processors to perform keeping the one or more routes in the global RIB comprise sequences of instructions which, when executed by the one or more processors, cause the one or more processors to perform keeping the one or more routes in the FIB even though the transport protocol process has become unavailable.

3. The apparatus of claim 2, further comprising third one or more stored sequences of instructions which, when executed by the one or more processors, cause the one or more processors to perform forwarding network packets over at least one route of the one or more routes installed in the FIB even though the transport protocol process has become unavailable.

4. The apparatus of claim 1, wherein:
the first set of routes does not include all routes in the one or more routes; and
the second one or more stored sequences of instructions further comprise sequences of instructions which, when executed by the one or more processors, cause the one or more processors to perform, after performing the unmarking step, removing from the global RIB any routes of the one or more routes that are still marked as stale in the local RIB.

5. The apparatus of claim 4, wherein the sequences of instructions, which cause the one or more processors to perform removing from the global RIB any routes that are still marked as stale in the local RIB, are executed by the one or more processors in response to any one of:
receiving an End-Of-RIB marker from the BGP peer process; and
an expiration of a timer, wherein the timer is set by the BGP process in response to detecting that the transport protocol process has become unavailable.

6. The apparatus of claim 1, wherein the sequences of instructions that cause the one or more processors to perform detecting that the transport protocol process has become unavailable comprise sequences of instructions which, when executed by the one or more processors, cause the one or more processors to perform detecting that the BGP session has become unavailable as a result of a failure of the transport protocol session over which the BGP session was established.

7. The apparatus of claim 1, wherein:
the apparatus is any one of a router and a switch; and the transport protocol process is any one of a Transmission Control Protocol (TCP) process and a Stream Control Transmission Protocol (SCTP) process.

8. A data packet router, comprising:
a network interface that is configured for coupling to a data network for receiving one or more packet flows therefrom;
one or more processors; and
a multi-process Operating System (OS) executed by the one or more processors, wherein the multi-process OS comprises a system manager, a Transmission Control Protocol (TCP) process and a Border Gateway Protocol (BGP) process;
wherein at least the TCP process is configured to restart separately from the multi-process OS; and
wherein the BGP process is configured at least to:
establish, over a TCP session managed by the TCP process, a BGP session with a BGP peer process that executes on a network element that is different than the router, wherein a BGP Graceful Restart capability negotiated for the BGP session indicates that the network element is configured to forward packets on routes received from the BGP process for a period of time during which the BGP session is not available;
manage a local Routing Information Base (RIB);
receive one or more routes from the BGP peer process over the BGP session;
store the one or more routes in the local RIB;
install the one or more routes in a global Routing Information Base (RIB);
wherein the global RIB stores routes that are received over a BGP protocol and over one or more route management protocols that are different than the BGP protocol;
receive a notification from the system manager when the TCP process becomes unavailable, wherein the BGP process has not restarted; and
in response to the notification that the TCP process has become unavailable, mark as stale each of the one or more routes in the local RIB;
keep, without changing, the one or more routes in the global RIB even though the TCP process has become unavailable;
after the TCP process has restarted, establish a new BGP session to the BGP peer process over a new TCP session, and notify the BGP peer process that the BGP session was lost because the TCP process has restarted;
receive a first set of routes from the BGP peer process over the new BGP session;
unmark as stale each route of the one or more routes in the local RIB that is included in the received first set of routes; and
remove from the local RIB and from the global RIB each route of the one or more routes that is not included in the received first set of routes.

9. The router of claim 8, further comprising a forwarding engine that includes a Forwarding Information Base (FIB), wherein:
the one or more routes are installed in the FIB; and
the forwarding engine forwards network packets over at least one route of the one or more routes installed in the FIB for a period of time during which the TCP process is unavailable.

10. An apparatus, comprising:
means for executing a transport protocol process; and
means for executing a Border Gateway Protocol (BGP) process that installs one or more routes in a global Routing Information Base (RIB), wherein the means for executing the BGP process comprise:
means for establishing, over a transport protocol session managed by the transport protocol process, a BGP session with a BGP peer process that executes on a network element that is different than the apparatus, wherein establishing the BGP session comprises negotiating a BGP Graceful Restart capability which indicates that the network element is configured to forward packets on routes received from the BGP process for a period of time during which the BGP session is not available;
means for receiving, at the BGP process, the one or more routes from the BGP peer process over the BGP session;
means for detecting that the transport protocol process has become unavailable, wherein the BGP process has not restarted;
means for marking as stale, after the transport protocol process has become unavailable, each of the one or more routes in a local RIB managed by the BGP process;
means for keeping, without changing, the one or more routes in the global RIB even though the transport protocol process has become unavailable;
means for establishing, after the transport protocol process has restarted, a new BGP session to the BGP peer process over a new transport protocol session, wherein establishing the new BGP session comprises notifying the BGP peer process that the transport protocol process has restarted;
means for receiving, at the BGP process, a first set of routes from the BGP peer process over the new BGP session; and
means for unmarking as stale each route of the one or more routes in the local RIB that is included in the received first set of routes;
wherein the global RIB stores routes that are received over a BGP protocol and over one or more route management protocols that are different than the BGP protocol.

11. The apparatus of claim 10, further comprising a Forwarding Information Base (FIB) in which the one or more routes are installed, wherein the means for keeping the one or more routes in the global RIB comprise means for keeping the one or more routes in the FIB even though the transport protocol process has become unavailable.

12. The apparatus of claim 11, further comprising means for forwarding network packets over at least one route of the one or more routes installed in the FIB even though the transport protocol process has become unavailable.

13. The apparatus of claim 10, wherein:
the first set of routes does not include all routes in the one or more routes; and
the means for executing the BGP process further comprise means for removing from the global RIB any routes of the one or more routes that are still marked as stale in the local RIB.

14. The apparatus of claim 13, wherein any routes that are still marked as stale in the local RIB are removed from the global RIB in response to any one of:
receiving an End-Of-RIB marker from the BGP peer process; and an expiration of a timer, wherein the timer is set by the BGP process in response to detecting that the transport protocol process has become unavailable.

15. The apparatus of claim 10, wherein the means for detecting that the transport protocol process has become unavailable comprise means for detecting that the BGP session has become unavailable as a result of a failure of the transport protocol session over which the BGP session was established.

16. The apparatus of claim 10, wherein:
the apparatus is any one of a router and a switch; and
the transport protocol process is any one of a Transmission Control Protocol (TCP) process and a Stream Control Transmission Protocol (SCTP) process.

17. A machine-implemented method for graceful restart in a multi-process operating system, comprising:
executing a transport protocol process on a network element;
executing a Border Gateway Protocol (BGP) process that installs one or more routes in a global Routing Information Base (RIB);
wherein the global RIB stores routes that are received over a BGP protocol and over one or more route management protocols that are different than the BGP protocol;
wherein executing the BGP process comprises:
establishing, over a transport protocol session managed by the transport protocol process, a BGP session with a BGP peer process that executes on a different network element, wherein a BGP Graceful Restart capability negotiated for the BGP session indicates that the different network element is configured to forward packets on routes received from the BGP process for a period of time during which the BGP session is not available;
receiving the one or more routes from the BGP peer process over the BGP session;
storing the one or more routes in a local RIB that is managed by the BGP process;
at the BGP process, detecting that the transport protocol process has become unavailable, wherein the BGP process has not restarted;
in response to detecting that the transport protocol process has become unavailable, marking as stale each of the one or more routes in the local RIB;
keeping, without changing, the one or more routes in the global RIB even though the transport protocol process has become unavailable;
after the transport protocol process has restarted,
establishing a new BGP session to the BGP peer process over a new transport protocol session, and
notifying the BGP peer process that the BGP session was lost because the transport protocol process has restarted;
receiving a first set of routes from the BGP peer process over the new BGP session;
unmarking as stale each route of the one or more routes in the local RIB that is included in the received first set of routes; and
removing from the local RIB and from the global RIB each route of the one or more routes that is not included in the received first set of routes;
wherein the method is performed by the network element.

18. The method of claim 17, further comprising:
installing the one or more routes in a Forwarding Information Base (FIB); and
forwarding network packets over at least one route of the one or more routes installed in the FIB for a period of time during which the transport protocol process is unavailable.

19. The method of claim 17, wherein:
the network element is any one of a router and a switch; and
the transport protocol process is any one of a Transmission Control Protocol (TCP) process and a Stream Control Transmission Protocol (SCTP) process.

20. A non-transitory computer-readable volatile or non-volatile medium storing one or more sequences of instructions for graceful restart in a multi-process operating system, which instructions, when executed by one or more processors, cause the one or more processors to perform the steps of:
executing a transport protocol process on a network element;
executing a Border Gateway Protocol (BGP) process that installs one or more routes in a global Routing Information Base (RIB);
wherein the global RIB stores routes that are received over a BGP protocol and over one or more route management protocols that are different than the BGP protocol;
wherein executing the BGP process comprises:
establishing, over a transport protocol session managed by the transport protocol process, a BGP session with a BGP peer process that executes on a different network element, wherein a BGP Graceful Restart capability negotiated for the BGP session indicates that the different network element is configured to forward packets on routes received from the BGP process for a period of time during which the BGP session is not available;
receiving the one or more routes from the BGP peer process over the BGP session;
storing the one or more routes in a local RIB that is managed by the BGP process;
at the BGP process, detecting that the transport protocol process has become unavailable, wherein the BGP process has not restarted;
in response to detecting that the transport protocol process has become unavailable, marking as stale each of the one or more routes in the local RIB;
keeping, without changing, the one or more routes in the global RIB even though the transport protocol process has become unavailable;
after the transport protocol process has restarted,
establishing a new BGP session to the BGP peer process over a new transport protocol session, and
notifying the BGP peer process that the BGP session was lost because the transport protocol process has restarted;
receiving a first set of routes from the BGP peer process over the new BGP session;
unmarking as stale each route of the one or more routes in the local RIB that is included in the received first set of routes; and
removing from the local RIB and from the global RIB each route of the one or more routes that is not included in the received first set of routes.

21. The non-transitory computer-readable medium of claim 20, wherein the one or more sequences of instructions further comprise instructions which, when executed by the one or more processors, cause the one or more processors to perform the steps of:
installing the one or more routes in a Forwarding Information Base (FIB); and forwarding network packets over at least one route of the one or more routes installed in the FIB for a period of time during which the transport protocol process is unavailable.

22. The non-transitory computer-readable medium of claim 20, wherein:

the network element is any one of a router and a switch; and
the transport protocol process is any one of a Transmission Control Protocol (TCP) process and a Stream Control Transmission Protocol (SCTP) process.

* * * * *